(12) United States Patent
Nagase

(10) Patent No.: US 7,168,829 B2
(45) Date of Patent: Jan. 30, 2007

(54) VEHICLE REAR GATE

(75) Inventor: Takeshi Nagase, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 167 days.

(21) Appl. No.: 10/819,935

(22) Filed: Apr. 8, 2004

(65) Prior Publication Data
US 2004/0202000 A1 Oct. 14, 2004

(30) Foreign Application Priority Data
Apr. 10, 2003 (JP) ............................ 2003-106034

(51) Int. Cl.
B60Q 1/00 (2006.01)
(52) U.S. Cl. ...................... 362/485; 362/496; 362/501
(58) Field of Classification Search ................ 362/496, 362/497, 499, 501, 485; 340/479
See application file for complete search history.

(56) References Cited

U.S. PATENT DOCUMENTS 2,241,647 A * 5/1941 Simon ......................... 362/497
5,144,538 A * 9/1992 Harris ......................... 362/485
6,805,398 B2 * 10/2004 Harima et al. ........... 296/146.7
6,929,294 B2 * 8/2005 Byrla et al. ............... 292/336.3

* cited by examiner

Primary Examiner—Thomas M. Sember
(74) Attorney, Agent, or Firm—Birch, Stewart, Kolasch & Birch, LLP

(57) ABSTRACT

A vehicle rear gate includes a gate panel, a garnish disposed on the gate panel, and a gate handle provided to the garnish. The gate handle can be turnable backward of a vehicle to open the gate panel. There is a stop lamp provided to the garnish, and a stop lamp attaching portion that reinforces the garnish.

6 Claims, 6 Drawing Sheets

VEHICLE REAR GATE

This Nonprovisional application claims priority under 35 U.S.C. § 119(a) on Patent Application No(s). 2003-106034 filed in JAPAN on Apr. 10, 2003, the entire contents of which are hereby incorporated by reference.

BACKGROUND OF THE INVENTION

1. Field of the Invention

The present invention relates to a rear gate for enclosing a rear portion of a rear body of a pickup truck or the like to open and close the portion, and more particularly to a rear gate to a back surface of which a closing handle is provided.

2. Description of the Related Art

As illustrated in FIG. 1 and FIG. 6, in a pickup truck 1, a garnish 5 made of resin is attached to a gate panel 4 of a conventional rear gate 3 that encloses the rear side of a rear body 2, and a gate handle 6 is incorporated into the garnish 5 such that the gate handle 6 can be turned backward of the vehicle on a supporting point as indicated with a chain double-dashed line in FIG. 6. The rear gate 3 can be opened backward of the vehicle by turning the gate handle 6 backward.

When the gate handle 6 is operated backward of the vehicle, the gate handle 6 is turned by the reaction caused by pushing the thumb of the operator against an upper end surface 8 of the garnish 5. Therefore, it is possible that the garnish 5 is damaged by a relatively large load applied to the upper end surface 8.

SUMMARY OF THE INVENTION

The present invention intends to prevent damage of a garnish by enhancing rigidity of the garnish even though a closing handle is provided to a rear gate of a pickup truck or the like via the garnish.

According to the present invention, there is provided a vehicle rear gate including: a gate panel; a garnish disposed on the gate panel; a gate handle provided to the garnish and being turnable backward of a vehicle to open the gate panel; a stop lamp provided to the garnish; and a stop lamp attaching portion that reinforces the garnish.

Such a structure in which the gate handle and the stop lamp are provided to the garnish has not been proposed. This structure is a new structure.

Since the gate handle and the stop lamp are incorporated into a single garnish that is attached to the gate panel of the rear gate, an assembling man-hour required for attaching the gate handle and the stop lamp to the vehicle can be reduced easily. Also, since the garnish is reinforced by the stop lamp attaching portion, when the gate handle is turned backward of the vehicle to open the rear gate and when a relatively large load is applied to the rear end portion of the garnish by the opening motion of the operator, the rear end portion can sufficiently support the load.

DETAILED DESCRIPTION OF PREFERRED EMBODIMENTS

Figure 1:
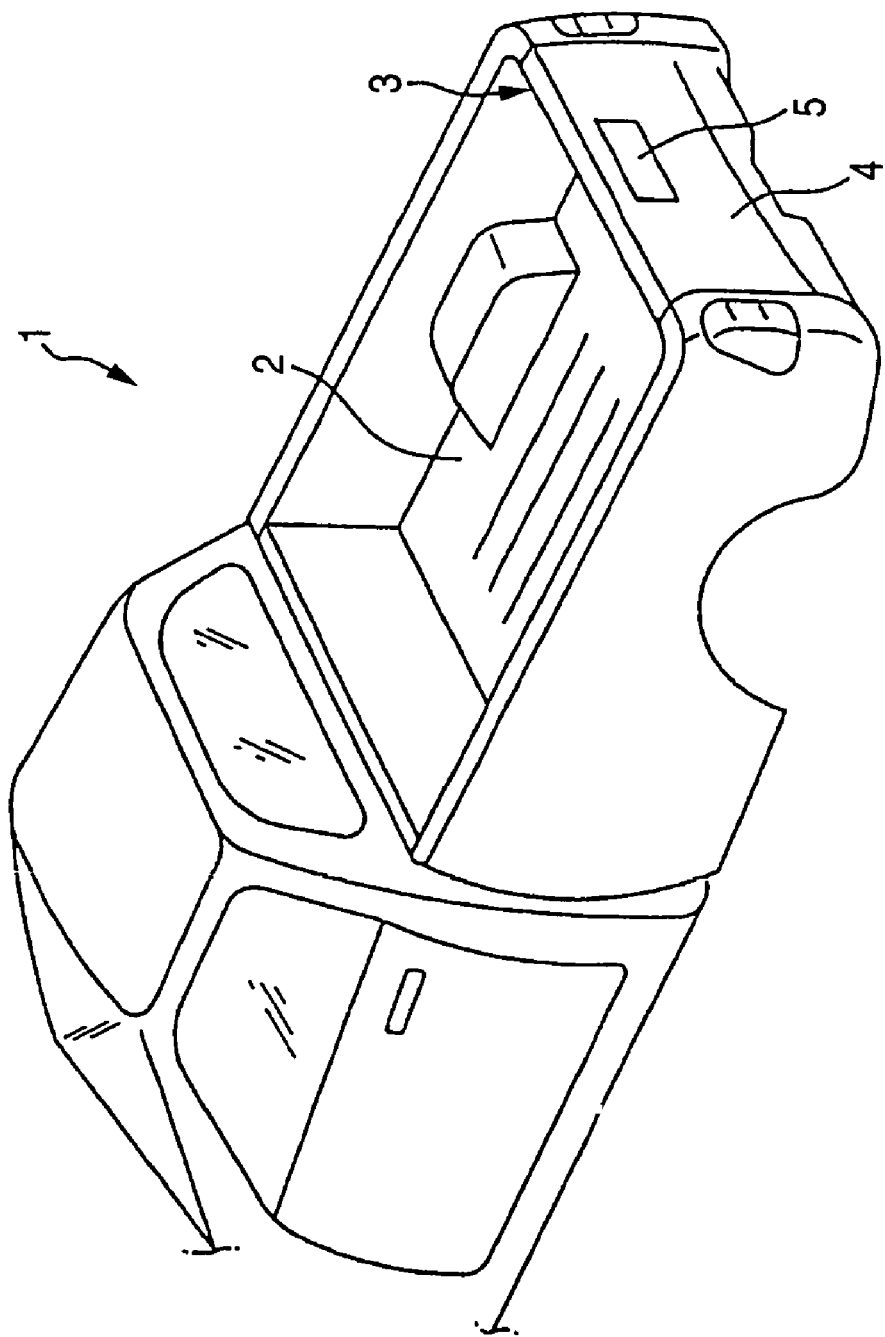
FIG. 1 is a schematic arrangement view in an embodiment of the present invention.
Figure 2:
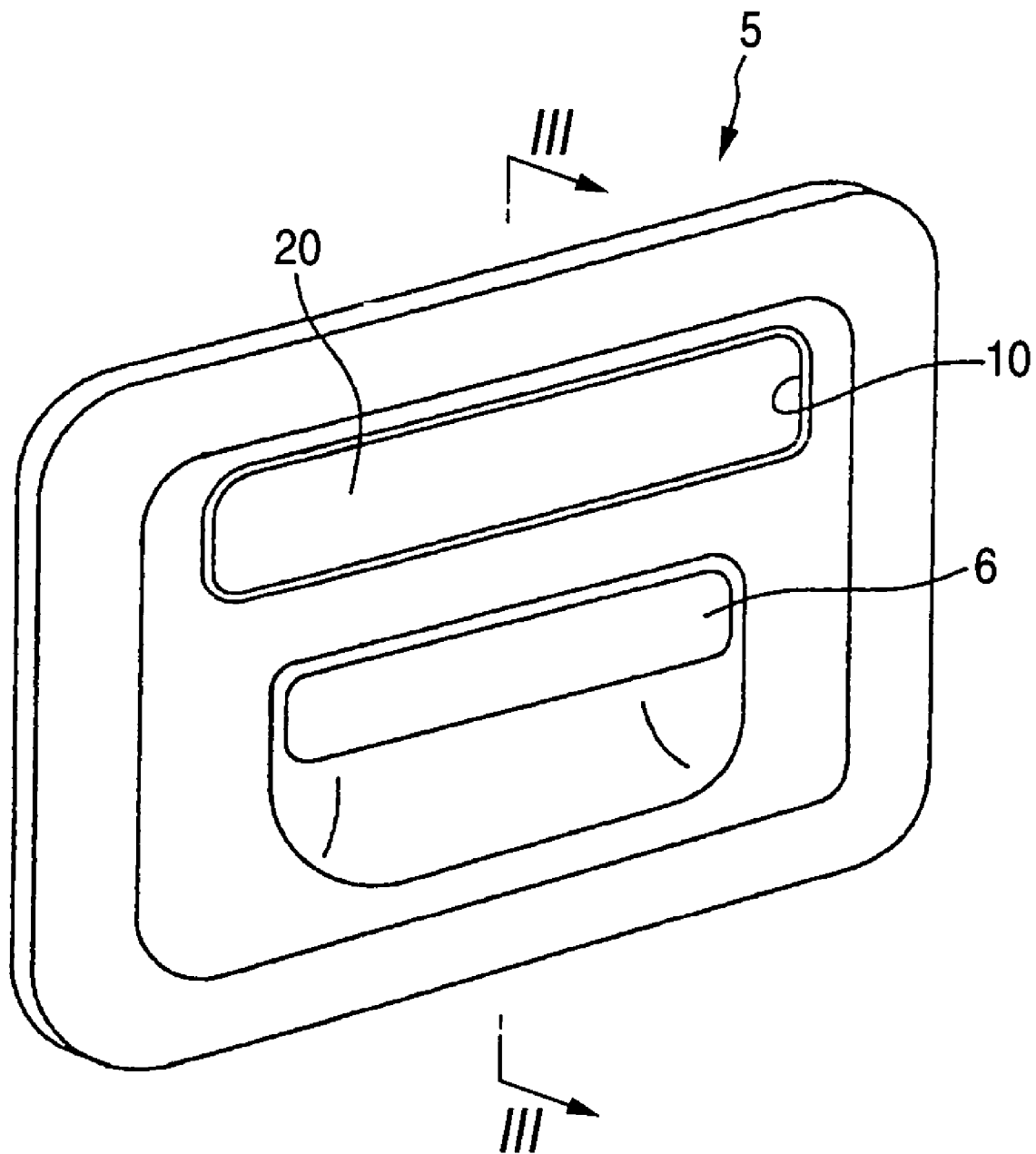
FIG. 2 is an enlarged perspective view of a pertinent portion of the embodiment.

An embodiment of the present invention will be described hereinafter while members and portions corresponding to those in the related art are denoted by the same reference numerals.

In FIG. 1 to FIG. 4, a rear gate 3 is provided at the back of a rear body 2 of a pickup truck 1, and a garnish 5 made of resin is attached to a gate panel 4 of the rear gate 3 from the backside of the vehicle.

Figure 3:
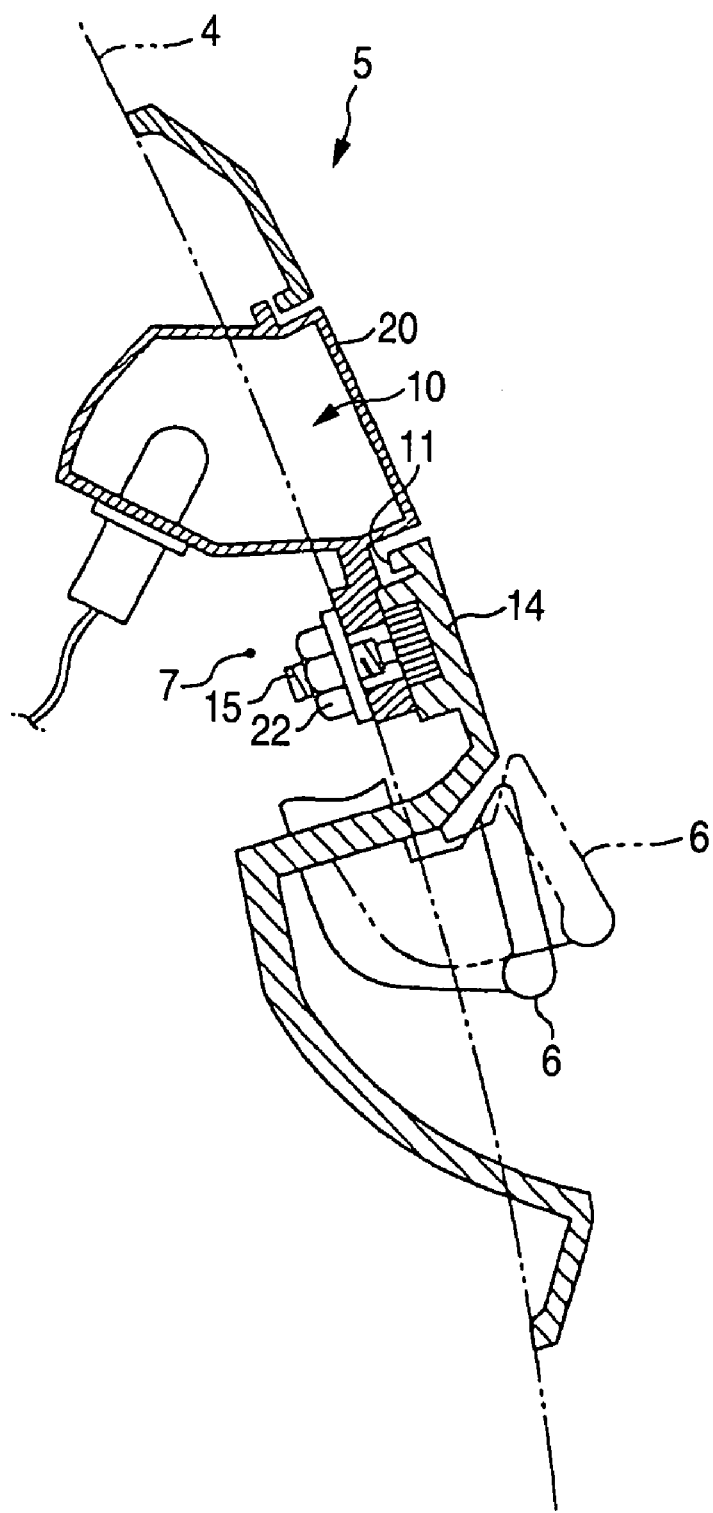
FIG. 3 is an enlarged longitudinal sectional view taken along line III—III in FIG. 2.
Figure 4:
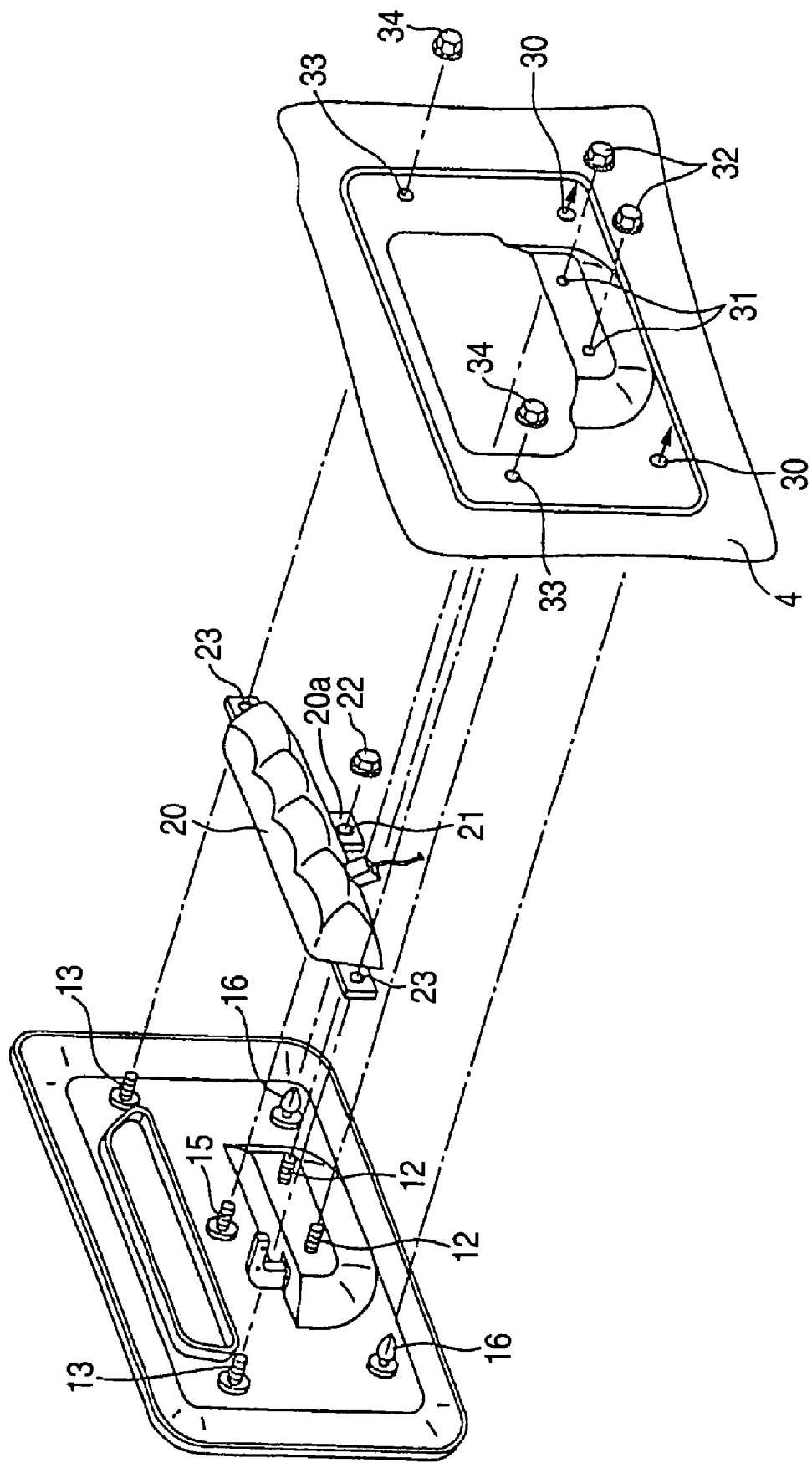
FIG. 4 is an exploded perspective view of the pertinent portion of the embodiment.

A gate handle 6 is incorporated into a lower portion of the garnish 5 in such a manner that the gate handle 6 can be turned about a supporting point 7 to the backward of the vehicle as indicated by a chain double-dashed line in FIG. 3. The rear gate 3 can be opened backward by turning backward the gate handle 6.

Also, a lateral window 10 is provided to an upper portion of the garnish 5. A rib 11 is formed around the window 10. Stud bolts 12, 13 are provided to the lower portion of the garnish 5 and both sides of the window 10 on the vehicle front side respectively. A stud bolt 15 is provided to a lower side of the window 10 on the vehicle front side, i.e., on the vehicle front side of a rear end portion 14 formed in the garnish 5 adjacent to an upper area of the lower portion of the garnish 5. In addition, clips 16 are molded integrally on both sides of the vehicle front side in the lower portion of the garnish 5 respectively.

Therefore, a high mounted stop lamp 20 can be fixed to the garnish 5 by fitting the stop lamp 20 into the window 10 from the vehicle front side, then inserting the stud bolt 15 into a lower bolt hole 21 formed in an attaching piece 20a of the stop lamp 20, and then screwing a nut 22. Then, the garnish 5 can be fixed to the gate panel 4 by pushing the clips 16 provided to the lower portion of the garnish 5 into fitting holes 30 of the gate panel 4, then inserting the stud bolts 12 of the garnish 5 into bolt holes 31 of the gate panel 4 and then screwing nuts 32, and also inserting the stud bolts 13 of the garnish 5 sequentially into side fitting holes 23 of the stop lamp 20 and into bolt holes 33 of the gate panel 4 respectively, and then screwing nuts 34.

Figure 5:
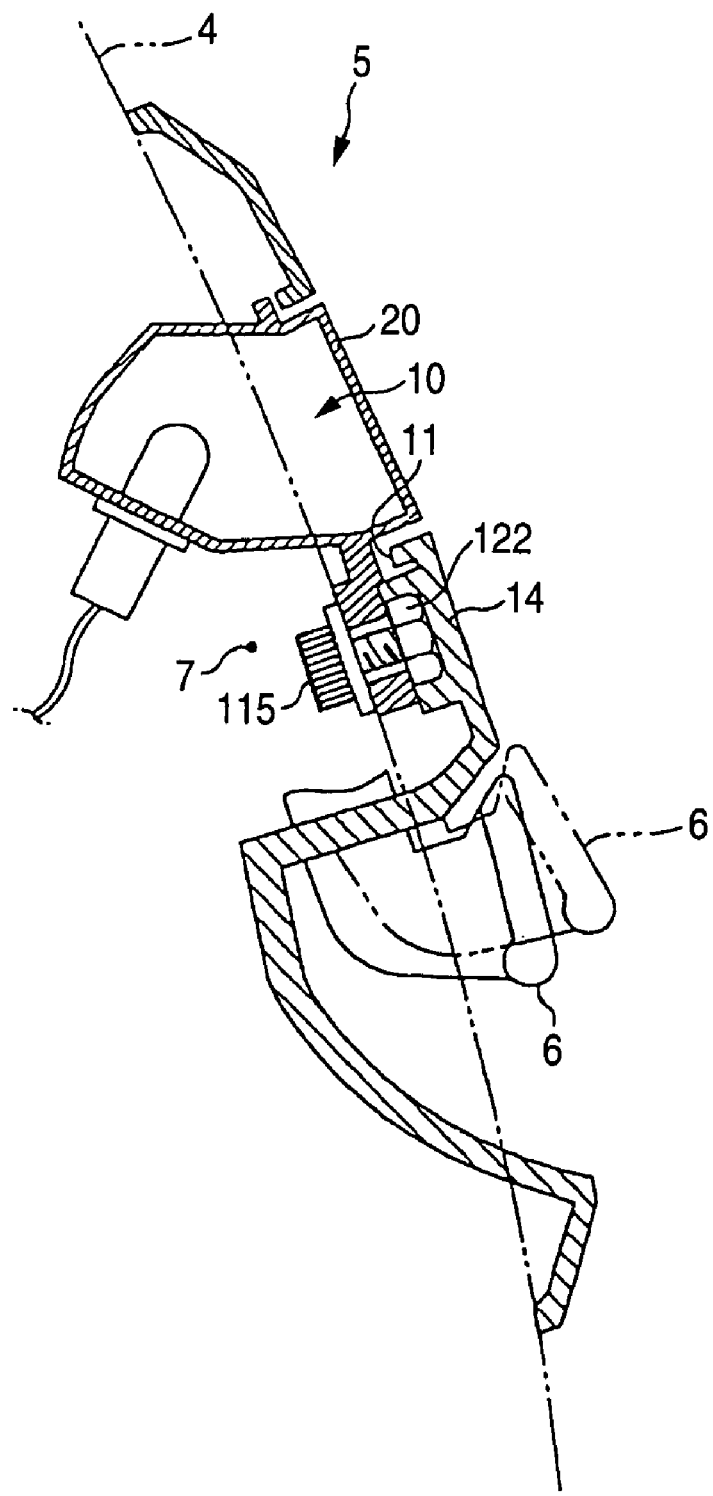
FIG. 5 is an exploded perspective view of a pertinent portion of another embodiment.
Figure 6:
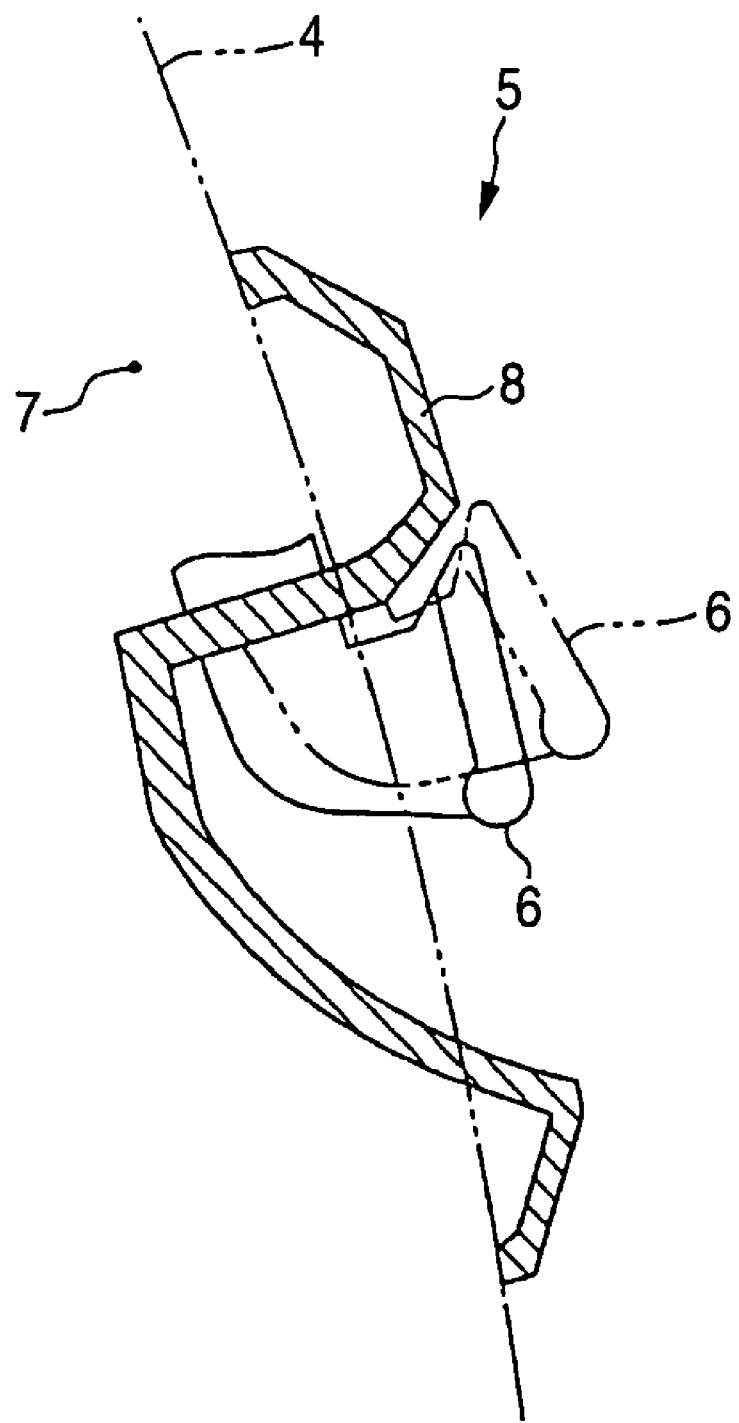
FIG. 6 is a longitudinal sectional view of a pertinent portion in the related art.

As shown in FIG. 5, the stud bolt 15 may be replaced with a stud nut 122, and then a bolt 115 may be inserted into the lower bolt hole 21 and screwed into the stud nut 122.

Since the gate handle 6 and the stop lamp 20 are incorporated into a single garnish 5, an assembling man-hour required for attaching the gate handle 6 and the stop lamp 20 to the vehicle can be reduced easily, and thus cost reduction of the vehicle can be achieved as a whole.

Also, the stud bolt 15 for fixing the stop lamp 20 is provided to the vehicle front side of the rear end portion 14 of the garnish 5, and thus a thickness of the rear end portion 14 is increased inevitably. Therefore, rigidity of the garnish 5 can be enhanced automatically and also rigidity of the neighborhood of the rear end portion 14 can be enhanced by the ribs 11 provided around the window 10 of the garnish 5.

Therefore, when the gate handle 6 is turned backward of the vehicle to open the rear gate 3, such gate handle 6 is turned by the reaction caused by pushing the thumb of the operator against the rear end portion 14 of the garnish 5. Even when a relatively large load is applied to the rear end portion 14, the rear end portion 14 can sufficiently support the load. Thus, it is possible to surely prevent the damage of the garnish 5.

As was described above, in the vehicle rear gate according to the present invention, since the gate handle and the stop lamp are incorporated into the garnish that is attached to the gate panel of the rear gate, the assembling man-hour of the gate handle and the stop lamp to the vehicle can be reduced easily and thus the cost reduction of the vehicle can be achieved. Also, the rigidity of the rear end portion formed adjacent to the upper area of the gate handle of the garnish can be enhanced. Therefore, even when the relatively large load is applied to the rear end portion by the motion of the operator who opens the rear gate, the rear end portion can support sufficiently the load and thus it is possible to prevent the damage of the garnish without fail.

What is claimed is:

1. A vehicle rear gate, comprising:
    a gate panel;
    a garnish disposed on the gate panel;
    a gate handle provided to the garnish and being turnable backward of a vehicle to open the gate panel;
    a stop lamp provided to the garnish; and
    a stop lamp attaching portion that reinforces the garnish, wherein the stop lamp attaching portion includes
      a rear end portion formed adjacent to an upper portion of the gate handle in the garnish, and
      an attaching member being attachable to a vehicle front side of the rear end portion.

2. The vehicle rear gate according to claim 1, wherein the stop lamp is fitted to a window that is formed in an upper side of the rear end portion of the garnish; and the rear end portion comprises a rib formed on a periphery of the window.

3. The vehicle rear gate according to claim 1, wherein the attaching member comprises:
    a stud bolt provided to the vehicle front side of the rear end portion; and
    a nut to be screwed to the stud bolt;
    wherein the stop lamp is attached to the garnish by the stud bolt and the nut.

4. The vehicle rear gate according to claim 1, wherein the attaching portion comprises:
    a stud nut provided to the vehicle front side of the rear end portion; and
    a bolt to be screwed to the stud nut;
    wherein the stop lamp is attached to the garnish by the stud nut and the bolt.

5. A vehicle rear gate, comprising:
    a gate panel;
    a garnish disposed on the gate panel;
    a gate handle provided to the garnish and being turnable backward of a vehicle to open the gate panel;
    a stop lamp provided to the garnish; and
    a stop lamp attaching portion;
    wherein a portion of the garnish to which a load is applied by an operator when the gate handle is turned is reinforced by the stop lamp attaching portion.

6. The vehicle rear gate according to claim 5, wherein when the gate handle is turned, the gate panel is rotated to be opened about a rotational axis extending along a lower portion of the gate panel.

* * * * *